United States Patent
Li et al.

(10) Patent No.: US 11,252,697 B2
(45) Date of Patent: Feb. 15, 2022

(54) RESOURCE SELECTION METHOD AND APPARATUS, USER EQUIPMENT AND STORAGE MEDIUM

(71) Applicant: DATANG MOBILE COMMUNICATIONS EQUIPMENT CO., LTD., Beijing (CN)

(72) Inventors: Chenxin Li, Beijing (CN); Rui Zhao, Beijing (CN); Fang-Chen Cheng, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 0 days.

(21) Appl. No.: 17/280,721

(22) PCT Filed: Sep. 17, 2019

(86) PCT No.: PCT/CN2019/106238
§ 371 (c)(1),
(2) Date: Mar. 26, 2021

(87) PCT Pub. No.: WO2020/063403
PCT Pub. Date: Apr. 2, 2020

(65) Prior Publication Data
US 2021/0314920 A1 Oct. 7, 2021

(30) Foreign Application Priority Data

Sep. 28, 2018 (CN) .......................... 201811142504.1

(51) Int. Cl.
*H04L 12/28* (2006.01)
*H04W 72/02* (2009.01)
(Continued)

(52) U.S. Cl.
CPC ....... *H04W 72/02* (2013.01); *H04W 72/0446* (2013.01); *H04W 72/0453* (2013.01); *H04W 72/0486* (2013.01); *H04W 72/10* (2013.01)

(58) Field of Classification Search
CPC . H04W 28/26; H04W 72/02; H04W 72/0446; H04W 72/0473
(Continued)

(56) References Cited

U.S. PATENT DOCUMENTS

| 2018/0227912 | A1 | 8/2018 | Chen et al. |
| 2018/0279259 | A1 | 9/2018 | Gulati et al. |
| 2021/0289496 | A1* | 9/2021 | Lee ........................ H04W 28/26 |

FOREIGN PATENT DOCUMENTS

| CN | 104981021 A1 | 10/2015 |
| CN | 107027181 A | 8/2017 |

(Continued)

OTHER PUBLICATIONS

International Search Report for International Application No. PCT/CN2019/106238 dated Dec. 23, 2019.
(Continued)

*Primary Examiner* — John Pezzlo
(74) *Attorney, Agent, or Firm* — Meunier Carlin & Curfman LLC

(57) ABSTRACT

The present application relates to the technical field of wireless communications, and in particular to a resource selection method and apparatus, a UE and a storage medium. The method involves: when a plurality of service packets arrive, for each service packet, if the number of candidate resource sets obtained by the current service data is at least two, determining a target resource set of the service packet; or when a plurality of service packets arrive, a UE sequentially selecting a sending resource in the corresponding target candidate resource set for each service packet, and
(Continued)

When a plurality of service packets arrive, the UE performs exclusion of occupied resources and/or power sorting in a corresponding target candidate resource set successively for each service packet — S501

The UE excludes, according to the number of its own PAs, first slot resources from an available candidate resource set for which the exclusion of occupied resources and/or power sorting, and then selects transmitting resources — S502 before selecting the sending resource, excluding first time slot resources and determining second time slot resources, and preferentially selecting the sending resource in available resources on the second time slot resources.

16 Claims, 9 Drawing Sheets

(51) Int. Cl.
*H04W 72/04* (2009.01)
*H04W 72/10* (2009.01)
*H04J 1/16* (2006.01)

(58) Field of Classification Search
USPC .......................................... 370/252, 329, 442
See application file for complete search history.

(56) References Cited

FOREIGN PATENT DOCUMENTS

| CN | 107277922 A | 10/2017 |
|---|---|---|
| CN | 107734551 A | 2/2018 |
| CN | 107925541 A | 4/2018 |
| CN | 107925970 A | 4/2018 |
| CN | 108024264 A | 5/2018 |
| CN | 108024266 A | 5/2018 |
| CN | 108141847 A | 6/2018 |
| CN | 108271252 A | 7/2018 |
| WO | 2016195582 A1 | 12/2016 |
| WO | 2018031086 A1 | 2/2018 |
| WO | 2018145628 A1 | 8/2018 |
| WO | 2018175528 A1 | 9/2018 |

OTHER PUBLICATIONS

R1-1720158 3GPP TSG RAN WGI Meeting #91 "Discussion on carrier aggregation for mode 4 in V2X Phase 2", Reno, USA Nov. 27-Dec. 1, 2017, 8 pages.
R1-1801701 3GPP TSG RAN WGI Meeting #92, "Discussion on carrier aggregation for mode 4 in V2X Phase 2", Athens, Greece, Feb. 26-Mar. 2, 2018, 7 pages.
R1-1808402 3GPP TSG RAN WGI Meeting #94 "Consideration on resources allocation mechanism in NR V2X" Gothenburg, Sewden, Aug. 20-24, 2018, 5 pages.
R1-1712339 3GPP TSG RAN WGI Meeting #90 "Discussion on carrier aggregation for mode 4 in V2X Phase 2" Prague, Czechia, Aug. 21-25, 2017, 6 pages.
Intel Corporation, Remaining Physical Layer Aspects of Sidelink Carrier Aggregation for Mode-4 LTE V2V Communication, 3GPP TSG RAN WG1 Meeting #92. R1-1802364, Athens, Greece, Feb. 26-Mar. 2, 2018.
Intel Corporation, Physical Layer Aspects of Sidelink Carrier Aggregation for Mode-4 LTE V2V Communication, 3GPP TSG RAN WG1 Meeting #91, R1-1720031, Reno, USA, Nov. 27-Dec. 1, 2017.
Sony, "Resource pool configurations on LTE sidelink for V2V services," 3GPP TSG RAN WG1 Meeting #84, R1-160679, St Julian's, Malta, Feb. 15-19, 2017.

* cited by examiner

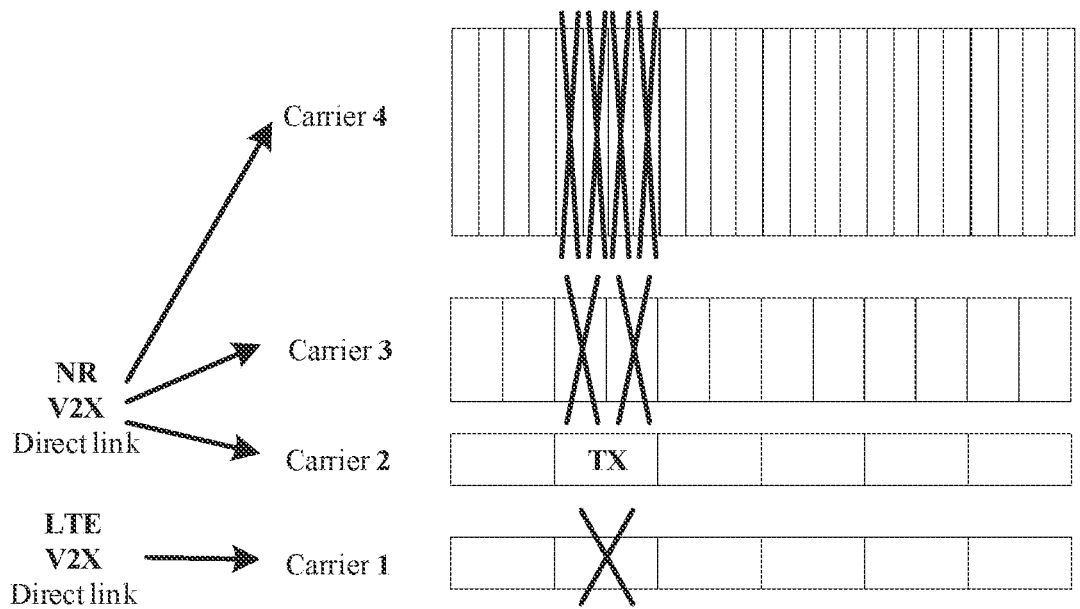

FIG. 2

| When a plurality of service packets arrive, for each service packet, determining the each service packet as a current service packet in sequence, and judging whether the number of candidate resource sets obtained for the each service packet is at least two | ~ S301 |

| If the number of candidate resource sets obtained by the current service packet is at least two, then determining, according to parameter sets corresponding to the candidate resource sets, a candidate resource set corresponding to a parameter set with the smallest slot length among the parameter sets as a target resource set of the service packet | ~ S302 |

FIG. 3

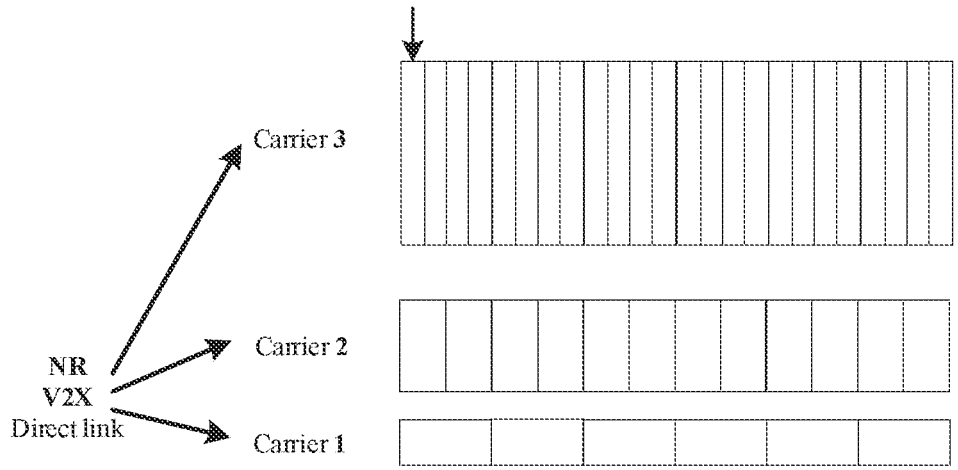

FIG. 4

When a plurality of service packets arrive, the UE performs exclusion of occupied resources and/or power sorting in a corresponding target candidate resource set successively for each service packet — S501

The UE excludes, according to the number of its own PAs, first slot resources from an available candidate resource set for which the exclusion of occupied resources and/or power sorting, and then selects transmitting resources — S502

FIG. 5

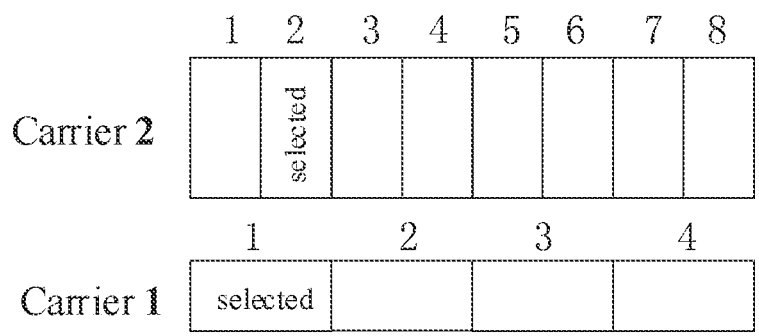

FIG. 6

RESOURCE SELECTION METHOD AND APPARATUS, USER EQUIPMENT AND STORAGE MEDIUM

CROSS-REFERENCE OF RELATED APPLICATIONS

The present application is a National Stage of International Application PCT No. PCT/CN2019/106238 filed on Sep. 17, 2019, which claims priority from Chinese Patent Application No. 201811142504.1, filed with the Chinese Patent Office on Sep. 28, 2018 and entitled "Resource Selection Method and Apparatus, Terminal and Storage Medium", both of which are hereby incorporated by reference in their entireties.

FIELD OF INVENTION

The present application relates to the field of wireless communication technology, and in particular to a resource selection method and apparatus, a user equipment (UE) and a storage medium.

BACKGROUND

In the LTE-V2X (Long Term Evolution-Vehicle to Everything) of 3rd Generation Partnership Project (3GPP) Release 14 and Release 15, the sidelink communication supports the sidelink transmission mode 3 and sidelink transmission mode 4. The sidelink transmission mode 3 is that a base station schedules and allocates resources for a UE, and the sidelink transmission mode 4 is that a UE (User Equipment) selects resources autonomously. The LTE-V2X sidelink communication of 3GPP Release 14 and Release 15 only supports broadcast communication.

The sidelink transmission mode 4 of 3GPP Release 14 supports the resource selection mechanism of Sensing+SPS (Sensing+Semi-Persistent Schedule (SPS)), and the specific scheme is as follows.

FIG. 1 is a schematic diagram of the time axis for selecting the transmitting resources on a LTE-V2X single carrier. As shown, the current selection of transmitting resources on the LTE-V2X single carrier includes the following steps.

Step 1: marking all candidate resources in the resource selection window as available.

Step 2: excluding the occupied resources, including the following two types.

The first type is: in a sensing window, a UE itself transmits and cannot monitor the service packets sent by other UEs on the transmitting subframe, which becomes the skip (not monitored) subframe, and it is necessary to assume that other UES on this subframe reserve the next resource in all resource reservation periods configured by the system, and the reserved resource overlaps with a candidate subframe or overlaps with 1, 2, . . . , 10*counter-1 transmitting subframe after the candidate subframe, and the above candidate subframe needs to be excluded, where the above 'counter' is a counter, representing the number of times the same block of resources is periodically occupied, such as 10 times, etc.

The second type is: to monitor the Scheduling Assignment (SA) sent by other UEs in the sensing window. According to the resource reservation period and resource reservation information learned from the SA, if the reserved resources overlap with the candidate resources or overlap with 1, 2, . . . , 10*counter-1 transmitting resources after the candidate subframe, and the PSSCH-RSRP (Physical Sidelink Shared Channel-Reference Signal Received Power) measured according to the SA is higher than the threshold, so the corresponding candidate resources need to be excluded.

If the proportion of remaining resources after the exclusion of step 2 is less than 20%, the threshold is increased by 3 dB and the exclusion process is performed again until the proportion of remaining resources reaches or exceeds 20%.

Step 3: performing the S-RSSI (Sidelink-Received Signal Strength Indication) measurement and sorting on the candidate resources, selecting 20% resources with the lowest S-RSSI measurement value, and selecting resources from the above 20% candidate resources by the high layer.

On the basis of the Sensing+SPS resource selection mechanism of 3GPP Release 14, the sidelink transmission mode 4 of 3GPP Release 15 adds the processing of multi-carrier resource selection, namely:

the high layer provides a candidate resource pool for the physical layer, and the physical layer performs the S-RSSI measurement and sorting on candidate resources according to the resource exclusion of the step 1 and step 2 of the Sensing mechanism of 3GPP Release 14, selects 20% resources with the lowest S-RSSI measurement value and reports them to the high layer, and the high layer excludes the following subframes beyond the UE's transmission capability:

(a) The number of TX chains (transmission chains) is less than the number of configured transmitting carriers;

(b) The UE cannot support the combination of given bands (frequency bands);

(c) The switching time of the TX chain.

Then, the transmitting resources are selected.

If the transmitting resources cause the UE to fail to meet the Radio Frequency (RF) requirement, for example, due to power spectral density (PSD) imbalance, the UE performs the resource selection independently for each carrier. If the resource selection result causes that the number of simultaneous transmissions exceeds the UE's transmission capability, then the resource selection process is executed again until the resource selection result can be supported by the UE.

The 3GPP RAN (Radio Access Network) #80 meeting passed the project approval of the third phase of NR (New Radio Access Technology) V2X SI (Study Item) of the 3GPP V2X, including the new physical layer structure design in the direction of research. Potentially, the NR V2X can support flexible parameter sets (numerology), that is, support different slot lengths in the time domain and different SCSs (Sub-carrier Spacings) in the frequency domain.

However, in the V2X sidelink communication mode, in the same frequency band, due to the influence of half-duplex, the transmitting is performed on one of the carriers, and the receiving cannot be performed on other carriers, so that all service packets on the time domain resource cannot be received, affecting the reliability of V2X communication. This situation will be significantly exacerbated when the NR V2X supports flexible parameter sets and when the NR V2X and LTE V2X coexist. That is, as shown in FIG. 2, when the service packets are sent on a slot on the carrier 2, one slot on the carrier 1, two slots on the carrier 3, and four slots on the carrier 4 will not be able to receive, which significantly affects the system performance.

On the other hand, in the same frequency band, for the same time domain affected by half-duplex, the NR V2X can potentially support the flexible parameter set configuration, so when the UE has the limited number of PAs (Power Amplifiers), the phase discontinuity may be caused when the PAs are shared, so that the transmission power fluctuates, and the system performance is significantly reduced.

Therefore, in the prior art, when the NR V2X can support the flexible parameter set configuration, it may be affected by half-duplex, and when the number of PAs is limited, the sharing of PAs in the case of inconsistent slots causes the discontinuity in the PA phase so that the system performance is significantly reduced.

BRIEF SUMMARY

The present application provides a resource selection method and apparatus, a UE and a storage medium, so as to solve the problem in the prior art that when the NR V2X can support the flexible parameter set configuration, it may be affected by half-duplex, and when the number of PAs is limited, the sharing of PAs in the case of inconsistent slots causes the discontinuity in the PA phase so that the system performance is significantly reduced.

According to one aspect of the present application, a resource selection method is provided, which includes:

when a plurality of service packets arrive, for each service packet, if the number of candidate resource sets obtained for the each service packet is at least two, then determining, according to parameter sets corresponding to the candidate resource sets, a candidate resource set corresponding to a parameter set with a smallest slot length among the parameter sets as a target resource set of the each service packet.

Specifically, if multiple parameter sets with the smallest slot length are in the parameter sets, a target resource set is selected from candidate resource sets corresponding to the parameter sets with the smallest slot length according to at least one of:

selecting the candidate resource set randomly;
selecting the candidate resource set with a lowest frequency;
selecting the candidate resource set of which a priority corresponds to a priority of the each service packet;
selecting the candidate resource set with a largest frequency-domain resource;
selecting the candidate resource set with lowest load; or
selecting the candidate resource set with most remaining resources after occupied resources are excluded.

Specifically, each candidate resource set is at least one kind of:
  a carrier;
  a resource pool; and
  a bandwidth part.

Specifically, each candidate resource set is determined by a UE according to the network configured parameters or according to pre-configured parameters.

According to another aspect of the present application, a resource selection method is further provided, which includes:

when a plurality of service packets arrive, selecting, by a UE, transmitting resources in a corresponding target candidate resource set successively for each service packet: for the each service packet, excluding, by the UE, according to the number of PAs of the UE, first slot resources from an available candidate resource set after performing exclusion of occupied resources and/or power sorting on a target candidate resource set corresponding to the each service packet, and selecting, by the UE, transmitting resources in an available candidate set excluding the first slot resources; where the first slot resources are slot resources that cause PA phases to be discontinuous when the PAs are shared.

Specifically, the excluding the first slot resources includes:

traversing all slots in the available candidate resource set, and excluding a first target slot that simultaneously meets following conditions as a first slat resource;

where the conditions include:
the UE simultaneously transmits service packets on other candidate resource sets on same time domains with a first target slot;
the UE simultaneously transmits service packets on other candidate resource sets on the slots that have different starting and ending points from the first target slot; and
the number of slots having different starting and ending points among slots that are used to transmit service packets simultaneously on other candidate resource sets has been equal to the number of PAs that the UE has.

Specifically, the selecting the transmitting resources in the available candidate set excluding the first slot resources includes:

determining second slot resources in the available candidate set excluding the first slot resources, and selecting the transmitting resources preferentially in available candidate resources on the second slot resources: where the second slot resources are slot resources that transmit service packets simultaneously on other candidate resources selected for other service packets.

Specifically, the determining the second slot resources in the available candidate set includes:

traversing all slots in a remaining available candidate resource set after excluding the first slot resources, and excluding a second target slot that meets a following condition as a second slot resource;

where the condition is: the UE simultaneously transmits service packets on other candidate resource sets on same time domains with a second target slot.

Specifically, the method further includes:
if the number of preferentially selected transmitting resources is less than the number of times a current service packet is sent, selecting a preset quantity of transmitting resources in the remaining available candidate resource set after excluding the first slot resources in addition to the preferentially selected transmitting resources, where the preset quantity is the number of times the current service packet is sent minus the number of preferentially selected transmitting resources.

Specifically, the selecting the preset quantity of transmitting resources in the remaining available candidate resource set after excluding the first slot resources in addition to the preferentially selected transmitting resources includes:

determining third slot resources, and selecting a preset quantity of transmitting resources preferentially in available candidate resources on the third slot resources; where the third slot resources are slot resources having a same parameter set as any one of other candidate resource sets currently sent by the UE, in slot resources where the available candidate resources are located after excluding the first and second slot resources.

Specifically, each candidate resource set is at least one kind of:
  a carrier;
  a resource pool; and
  a bandwidth part.

Specifically, when the plurality of service packets arrive, the UE selects the transmitting resources in the corresponding target candidate resource set successively for each service packet according to at least one of:

an order of slot lengths in parameter sets of all target candidate resource sets from small to large;

an order of the number of same slot lengths in parameter sets of all target candidate resource sets from more to less;

a numbering order of target candidate resource sets configured at the network side or pre-configured;

a priority order of target candidate resource sets configured at the network side or pre-configured;

a priority order of service packets corresponding to target candidate resource sets; and a resource selection order of target candidate resource sets notified by high-level.

Specifically, each candidate resource set is determined by the UE according to the network configured parameters or according to pre-configured parameters.

According to another aspect of the present application, a resource selection apparatus is further provided, which includes:

a judging module configured to: when a plurality of service packets arrive, for each service packet, determine the each service packet as a current service packet in sequence, and judge whether the number of candidate resource sets obtained for the current service packet is at least two; and a selection module configured to: if the number of candidate resource sets obtained for the current service packet is at least two, then determine, according to parameter sets corresponding to the candidate resource sets, a candidate resource set corresponding to a parameter set with a smallest slot length among the parameter sets as a target resource set of the current service packet.

According to another aspect of the present application, a resource selection apparatus is further provided, which includes:

a sorting module configured to: when a plurality of service packets arrive, perform exclusion of occupied resources and/or power sorting in a corresponding target candidate resource set successively for each service packet;

a selection module configured to: exclude, according to the number of PAs of the UE, first slot resources from an available candidate resource set for which exclusion of occupied resources and/or power sorting is performed, and then select transmitting resources.

According to another aspect of the present application, there is also provided a UE, which includes: a processor and a memory; and the processor is configured to read a program in the memory to perform:

when a plurality of service packets arrive, for each service packet, if the number of candidate resource sets obtained for the each service packet is at least two, then determining, according to parameter sets corresponding to the candidate resource sets, a candidate resource set corresponding to a parameter set with a smallest slot length among the parameter sets as a target resource set of the each service packet.

Specifically, the processor is further configured to: if multiple parameter sets with the smallest slot length are in the parameter sets, select a target resource set from candidate resource sets corresponding to the parameter sets with the smallest slot length according to at least one of:

selecting the candidate resource set randomly;

selecting the candidate resource set with a lowest frequency;

selecting the candidate resource set of which a priority corresponds to a priority of the each service packet;

selecting the candidate resource set with a largest frequency-domain resource;

selecting the candidate resource set with lowest load; or selecting the candidate resource set with most remaining resources after occupied resources are excluded.

According to another aspect of the present application, there is also provided a computer readable storage medium, which stores a computer program executable by an electronic device. When the program runs on the electronic device, the electronic device performs the steps in the resource selection method described above.

According to another aspect of the present application, there is also provided a UE, which includes: a processor and a memory; and the processor is configured to read a program in the memory to perform:

when a plurality of service packets arrive, selecting, by a UE, transmitting resources in a corresponding target candidate resource set successively for each service packet; for each service packet: excluding, by the UE, according to the number of PAs of the UE, first slot resources from an available candidate resource set after performing exclusion of occupied resources and/or power sorting on a target candidate resource set corresponding to the each service packet, and selecting transmitting resources in an available candidate set excluding the first slot resources; where the first slot resources are slot resources that cause PA phases to be discontinuous when the PAs are shared.

Specifically, the processor is specifically configured to: traverse all slots in the available candidate resource set, and exclude a first target slot that simultaneously meets following conditions as a first slot resource;

where the conditions include:

the UE simultaneously transmits service packets on other candidate resource sets on same time domains with a first target slot;

the UE simultaneously transmits service packets on other candidate resource sets on the slots that have different starting and ending points from the first target slot; and the number of slots having different starting and ending points among slots that are used to transmit service packets simultaneously on other candidate resource sets has been equal to the number of the PAs that the UE has.

Specifically, the processor is specifically configured to: determine second slot resources in the available candidate set excluding the first slot resources, and select the transmitting resources preferentially in available candidate resources on the second slot resources; where the second slot resources are slot resources that transmit service packets simultaneously on other candidate resources selected for other service packets.

Specifically, the processor is specifically configured to: traverse all slots in a remaining available candidate resource set after excluding the first slot resources, and exclude a second target slot that meets a following condition as a second slot resource; where the condition is: the UE simultaneously transmits service packets on other candidate resource sets on same time domains with a second target slot.

Specifically, the processor is specifically configured to: if the number of preferentially selected transmitting resources is less than the number of times the current service packet is sent, select a preset quantity of transmitting resources in the remaining available candidate resource set after excluding the first slot resources in addition to the preferentially selected transmitting resources.

Specifically, the processor is specifically configured to: determine third slot resources, and select a preset quantity of transmitting resources preferentially in available candidate resources on the third slot resources; where the third slot resources are slot resources having a same parameter set as any one of other candidate resource sets currently sent by the UE, in slot resources where the available candidate resources are located after excluding the first and second slot resources.

Specifically, the processor is specifically configured to: when the plurality of service packets arrive, select the transmitting resources in the corresponding target candidate resource set successively for each service packet according to at least one of an order of slot lengths in parameter sets of all target candidate resource sets from small to large;

an order of the number of same slot lengths in parameter sets of all target candidate resource sets from more to less;

a numbering order of target candidate resource sets configured at the network side or pre-configured;

a priority order of target candidate resource sets configured at the network side or pre-configured;

a priority order of service packets corresponding to target candidate resource sets; and a resource selection order of target candidate resource sets notified by high-level.

According to another aspect of the present application, there is also provided a computer readable storage medium, which stores a computer program executable by an electronic device. When the program runs on the electronic device, the electronic device performs the steps in the resource selection method described above.

The present application has the following beneficial effects.

The present application provides a resource selection method and apparatus, a UE and a storage medium. When a plurality of service packets arrive, for each service packet, if the number of candidate resource sets obtained by the current service packet is at least two, then the target resource set of the service packet is determined; or when a plurality of service packets arrive, the UE selects the transmitting resources in the corresponding target candidate resource set successively for each service packet, excludes the first slot resources and determines the second slot resources before selecting the transmitting resources, and selects the transmitting resources preferentially in the available resources on the second slot resources. The resource selection method provided in the present application is applicable to the scenarios of multi-carrier transmission on the NR V2X sidelink in the same frequency band and the scenarios where the NR V2X and LTE V2X coexist. On the one hand, the corresponding resource allocation processing is performed in consideration of UE capabilities, such as: whether the UE has multiple PAs, and whether the UE can simultaneously transmit services on different carriers and on slots with different time domain starting points; and on the other hand, the number of slots that cannot be monitored due to the influence of half-duplex can be reduced as much as possible in consideration of the influence of half-duplex.

BRIEF DESCRIPTION OF THE DRAWINGS

In order to illustrate the embodiments of the present application or the technical solutions in the prior art more clearly, the accompanying figures which need to be used in describing the embodiments or the prior art will be introduced below briefly. Obviously the accompanying figures described below are some embodiments of the present application, and other accompanying figures can also be obtained by those ordinary skilled in the art according to these accompanying figures without creative labor.

FIG. 2 is a schematic diagram of the half-duplex impact aggravated after introducing flexible parameter sets in the NR V2X in the background art.

FIG. 3 is a first one of flowcharts of a resource selection method provided by an embodiment of the present application.

FIG. 4 is a schematic diagram of determining a target parameter set in an embodiment of the present application.

FIG. 5 is a second one of flowcharts of a resource selection method provided by an embodiment of the present application.

FIG. 6 is a schematic diagram of selecting the transmitting resources according to the number of PAs in an embodiment of the present application.

DETAILED DESCRIPTION OF THE EMBODIMENTS

Figure 1:
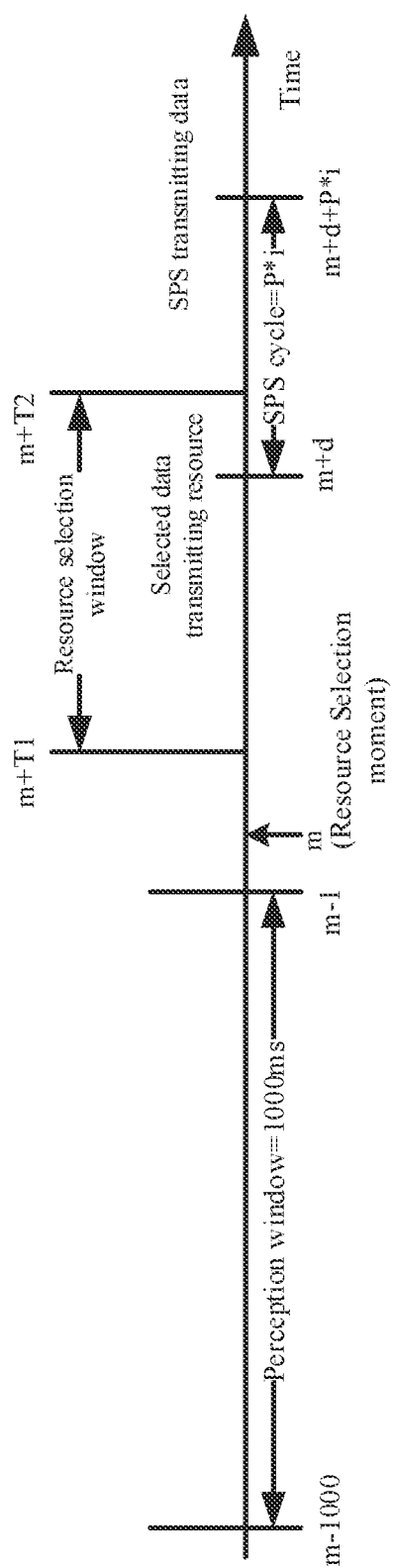
FIG. 1 is a schematic diagram of the time axis for selecting the transmitting resources on a LTE-V2X single carrier in the background art.

In order to make the objects, technical solutions and advantages of the present application clearer, the present application will be further illustrated below in details with reference to the accompanying drawings. Obviously the described embodiments are merely a part of the embodiments of the present application but not all the embodiments. Based upon the embodiments of the present application, all of other embodiments obtained by those ordinary skilled in the art without creative work pertain to the protection scope of the present application.

First Embodiment

In order to solve the problem that the system performance is reduced because multiple slots cannot be received when service packets are sent in the case that the NR V2X can support the flexible parameter set configuration due to the influence of half-duplex, an embodiment of the present application provides a resource selection method, as shown in FIG. 3, which includes the following steps.

Step S301: when a plurality of service packets arrive, for each service packet, determining the each service packet as a current service packet in sequence, and judging whether the number of candidate resource sets obtained for the each service packet is at least two.

Step S302: if the number of candidate resource sets obtained by the current service packet is at least two, then determining, according to parameter sets corresponding to the candidate resource sets, a candidate resource set corresponding to a parameter set with the smallest slot length among the parameter sets as a target resource set of the service packet.

Specifically, in embodiments of the present application, the candidate resource set includes at least one kind of: a carrier; a resource pool; and a bandwidth part (BWP). The candidate resource set can be at least one kind of a carrier, a resource pool, and a bandwidth part or various combinations thereof. For example, if only one resource pool is configured on each carrier and the resource pool covers all frequency domain resources on the entire carrier, then the candidate resource set may take the carrier or resource pool as the granularity; if multiple resource pools are configured on each carrier, then the determined candidate resource set takes the resource pool as the granularity; and similarly, if multiple bandwidth parts are configured on each carrier, then the determined candidate resource set takes the bandwidth part as the granularity. The parameters related to the resource pool or bandwidth part can be obtained through the network-side configuration or pre-configured parameters.

Here, in embodiments of the present application, the candidate resource set is determined by the UE according to the network configured parameters or the pre-configured parameters, so the UE can determine the candidate resource set that can be obtained by the service packet according to the network configured parameters or its own pre-configured parameters. Thus, when the UE detects that a service packet arrives, the UE can judge whether the number of candidate resource sets for the service packet is multiple. If so, in order to avoid the influence of half-duplex to the greatest extent, then the candidate resource set with the smallest slot length among the parameter sets will be selected preferentially for the service packet when selecting resources for the service packet.

That is, as shown in FIG. 4, it is assumed, for a certain service packet, that the high layer of the network side uses the carrier 1, carrier 2 and carrier 3 as the transmitting carriers of the service packet, where the parameter set of the carrier 1 is the sub-carrier spacing of 15 KHz and corresponding slot length is 1 ms, the parameter set of the carrier 2 is the sub-carrier spacing of 30 KHz and the corresponding slot length is 0.5 ms, and the sub-carrier spacing of the carrier 3 is 60 KHz and the corresponding slot length is 0.25 ms. Since the slot length of the carrier 3 is the smallest, only one slot will be affected by half-duplex and cannot receive data for both the carrier 1 and carrier 2 when a service packet is sent on the carrier 3, and the system performance purpose can be achieved. Thus, the UE will finally determine the carrier 3 as the transmitting carrier of the service packet.

Therefore, in embodiments of the present application, when the flexible parameter set is introduced to the NR V2X for multi-carrier/resource pool/bandwidth part transmission, the half-duplex effect can be greatly reduced by using the method of transmitting on a centralized slot, thereby improving the system performance.

Second Embodiment

Since there may be multiple candidate resource sets for the current service packet, there may be candidate resource sets with the same parameter set among these candidate resource sets, and thus the number of target resource sets determined for the current service packet may also be multiple. Therefore, on the basis of the above-mentioned embodiments, in an embodiment of the present application, if multiple parameter sets with the smallest slot length are in the parameter sets, a target resource set is selected from the candidate resource sets corresponding to the parameter sets with the smallest slot length according to at least one of:
  selecting a candidate resource set randomly;
  selecting a candidate resource set with a lowest frequency;
  selecting a candidate resource set of which the priority corresponds to the priority of the service packet;
  selecting a candidate resource set with a largest frequency-domain resource;
  selecting a candidate resource set with lowest load; or
  selecting a candidate resource set with most remaining resources after occupied resources are excluded.

In other words, when there are multiple target resource sets determined for the current service packet, the UE can select randomly according to its own needs, or can select according to a preset selection method. It should be noted that there is no limitation on the method to select the transmitting resources for the current service packet from multiple target resource sets in the embodiments of the present application.

Third Embodiment

Since the process of transmitting service packets is also affected by half-duplex, in order to avoid the UE from being unable to receive due to occupying more slots, the service packets should be sent in the more concentrated time domain as much as possible. However, when there are many service packets and the number of PAs of the UE is limited, the problem of PA sharing is inevitably involved. Since the lengths of the selected slots may be different when the PAs are shared, the phase discontinuity may be caused when the PAs are shared, thereby affecting the system performance. Therefore, according to another aspect of the present application, a resource selection method is further provided to overcome the problem of significantly reduced system performance due to the phase discontinuity caused when the PAs are shared in the process of transmitting service packets. As shown in FIG. 5, the method includes the following steps.

Step S501: when a plurality of service packets arrive, the UE performs exclusion of occupied resources and/or power sorting in a corresponding target candidate resource set successively for each service packet.

For each service packet, the UE will perform the exclusion of occupied resources and/or power sorting from the target candidate resource set of the service packet, and then select a certain proportion of candidate resources as the available candidate resource set of the service packet. Here, the process of performing the exclusion of occupied resources and/or power sorting on the target candidate resource set is the prior art, so the details will not be repeated in the embodiment of the present application.

Step S502: the UE excludes, according to the number of its own PAs, first slot resources from an available candidate resource set for which the exclusion of occupied resources and/or power sorting, and then selects transmitting resources.

That is to say, when a plurality of service packets arrive, the UE needs to consider the capabilities of the UE preferentially when selecting the transmitting resources successively for the service packets at the time of selecting the transmitting resources, where the so-called capabilities of the UE include the number of transmitting links that the UE can currently support, and the number of PAs the UE has.

If the UE has 2 PAs and the number of currently-supported transmitting links is 3, then for the first service packet, the UE can select one slot resource from the target candidate resource set corresponding to the first service packet. Here, since the UE has 2 PAs, in order to avoid the UE from being unable to receive due to occupying more slots, one slot that overlaps with the time domain corresponding to the slot resource selected for the first service packet should be selected from the target candidate resource set corresponding to the second service packet when selecting the transmitting resources for the second service packet. That is, as shown in FIG. 6, when selecting the transmitting resources based on the number of PAs, it is assumed that the UE selects the transmitting resources for the first service packet on the carder 1 and the UE selects the transmitting resources for the second service packet on the carrier 2, if the slot 1 on the carrier 1 has been selected, the selection should be made in the resources that overlap with the time domain of the slot 1 when selecting the transmitting resources for the second service packet on the carrier 2. Thus, the optional slots for the second service packet are slot 1 and slot 2 at this time. Since each PA corresponds to a different starting point in the time domain, the UE selects the slot 2 for the second service packet.

Specifically, in embodiments of the present application, when a plurality of service packets arrive, the UE selects the transmitting resources in the corresponding target candidate resource set successively for each service packet according to at least one of:

an order of slot lengths in parameter sets of all target candidate resource sets from small to large;

an order of the number of same slot lengths in parameter sets of all target candidate resource sets from more to less;

the numbering order of target candidate resource sets configured at the network side or pre-configured;

a priority order of target candidate resource sets configured at the network side or pre-configured;

a priority order of service packets corresponding to target candidate resource sets; and a resource selection order of target candidate resource sets notified by high-level.

That is to say, when the UE selects resources for each service packet, it may select a target candidate resource set for each service packet according to at least one of the above prescribed orders, which is not specifically limited in the embodiments of the present application.

Specifically, in embodiments of the present application, the candidate resource set includes at least one kind of: a carrier; a resource pool; and a bandwidth part. The candidate resource set can be at least one kind of a carrier, a resource pool, and a bandwidth part or various combinations thereof. For example, if only one resource pool is configured on each carrier and the resource pool covers all frequency domain resources on the entire carrier, then the candidate resource set may take the carrier or resource pool as the granularity; if multiple resource pools are configured on each carrier, then the determined candidate resource set takes the resource pool as the granularity; and similarly, if multiple bandwidth parts are configured on each carrier, then the determined candidate resource set takes the bandwidth part as the granularity. The parameters related to the resource pool or bandwidth part can be obtained through the network-side configuration or the pre-configured parameters.

Here, after selecting the available candidate resources, the UE will further exclude the slot resources that cause the PA phase discontinuity when sharing the PAs, that is, the first slot resources. Therefore, when the PAs are shared for the service packets exceeding the number of PAs, it can be ensured that the transmitting resources selected for the service packets sharing the PAs are all the slot resources of the PA phase, so as to avoid the problem of significantly reduced system performance due to the phase discontinuity when the PAs are shared in the process of transmitting service packets.

Here, the resource selection method provided in the present application is applicable to the scenarios of multi-carrier transmission on the NR V2X sidelink in the same frequency band and the scenarios where the NR V2X and LTE V2X coexist. The corresponding resource allocation processing can be performed in combination with the consideration of UE capabilities, such as: whether the UE has multiple PAs, and whether the UE can simultaneously transmit services on different carriers and on slots with different time domain starting points, so as to avoid the significantly reduced system performance due to the phase discontinuity caused when the PAs are shared in the case of the limited number of PAs and inconsistent slots.

Fourth Embodiment

As can be seen from the above embodiments, after selecting the available candidate resources, the UE will further exclude the slot resources that cause the PA phase discontinuity when sharing the PAs, that is, exclude the first slot resources described above. Thus, in embodiments of the present application, excluding the first slot resources includes:

traversing all slots in the available candidate resource set, where a first target slot that simultaneously meets the following conditions is the first slot resource:

the UE simultaneously transmits service packets on other candidate resource sets on same time domains with a first target slot;

the UE simultaneously transmits service packets on other candidate resource sets on the slots that have different starting and ending points from the first slot; and the number of slots having different starting and ending points among slots that are used to transmit service packets simultaneously on other candidate resource sets has been equal to the number of PAs that the UE has.

Figure 7A:
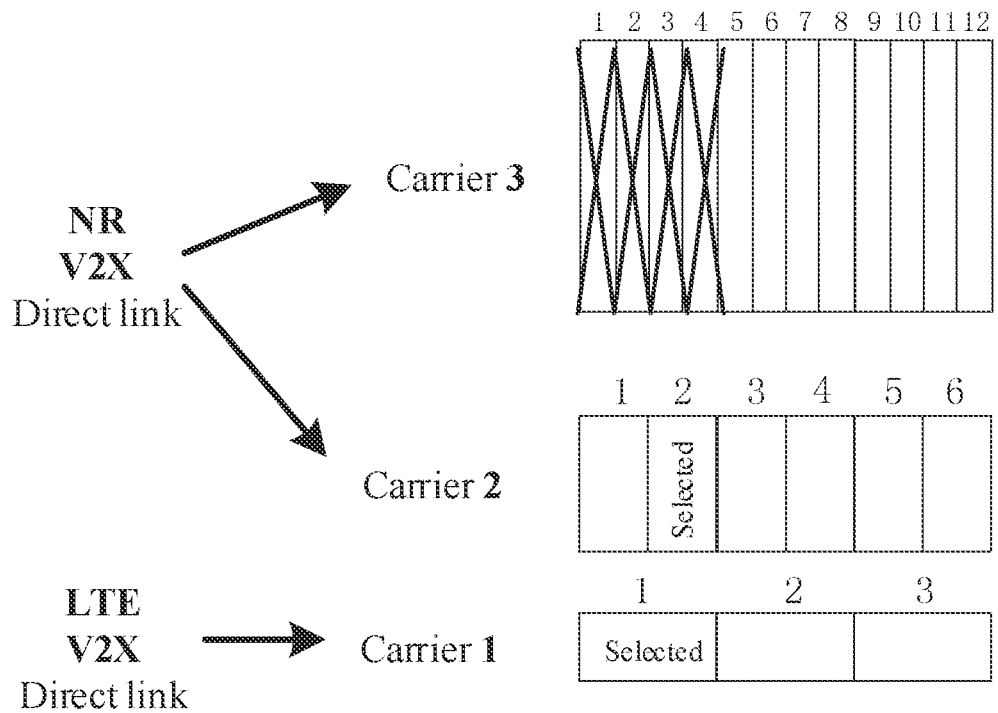
FIG. 7A is a schematic diagrams in which the carrier avoids the PA phase discontinuity (excluding the first slot resources) caused by the selection of transmitting resources in the first case in an embodiment of the present application.

In a first scenario, as shown in FIG. 7A, the carrier 1 is a sidelink carrier of LTE V2X, and the carriers 2 and 3 are sidelink carriers of NR V2X; the sub-carrier spacing of the carrier 1 is 15 KHz, and the corresponding slot length is 1 ms; the sub-carrier spacing of the carrier 2 is 30 KHz, and the corresponding slot length is 0.5 ms; the sub-carrier spacing of the carrier 3 is 60 KHz, and the corresponding slot length is 0.2 ms; the UE selects transmitting resources for service packets on the carrier 3; the slot 1 of the carrier 1 has been selected, and the slot 2 of the carrier 2 has been selected; the number of transmitting links supported by the UE is 3; and the number of PAs of the UE is 2.

All slots on the carrier 3 are judged successively according to the above conditions. Since there are service packets sent simultaneously in the slot 1 on the carrier 1 on the same time domain as the slot 1 on the carrier 3, and the starting point and ending point of the slot 1 on the carrier 3 are the same as those of the slot 1 on the carrier 1, the slot 1 on the carrier 3 is excluded; since there are service packets sent simultaneously in the slot 1 on the carrier 1 on the same time domain as the slot 2 on the carrier 3, and the starting point and ending point of the slot 2 on the carrier 3 are the same as those of the slot 1 on the carrier 1, the slot 2 on the carrier 3 is excluded; since there are service packets sent simultaneously in the slot 1 on the carrier 1 and there are also service packets sent simultaneously in the slot 2 on the carrier 2 on the same time domain as the slot 3 on the carrier 3, and the starting point and ending point of the slot 3 on the carrier 3 are the same as those of the slot 1 on the carrier 1, the slot 3 on the carrier 3 is excluded; since there are service packets sent simultaneously in the slot 1 on the carrier 1 and there are also service packets sent simultaneously in the slot 2 on the carrier 2 on the same time domain as the slot 4 on the carrier 3, and the starting point and ending point of the slot 4 on the carrier 3 are the same as those of the slot 1 on the carrier 1, the slot 4 on the carrier 3 is excluded; but there is no service packet sent on other candidate resource sets on the same time domain as the slots 5-12 on the carrier 3, so the slots 5-12 on the carrier 3 are not excluded. Therefore, the slots 1, 2, 3 and 4 on the carrier 3 have different starting points or ending points from the slot 1 on the carrier 1 and the slot 2 on the carrier 2, and the UE has only 2 PAs; so the slots 1, 2, 3 and 4 on the carrier 3 are the first slot resources, and the candidate resources on the above slots are all excluded.

Figure 7B:
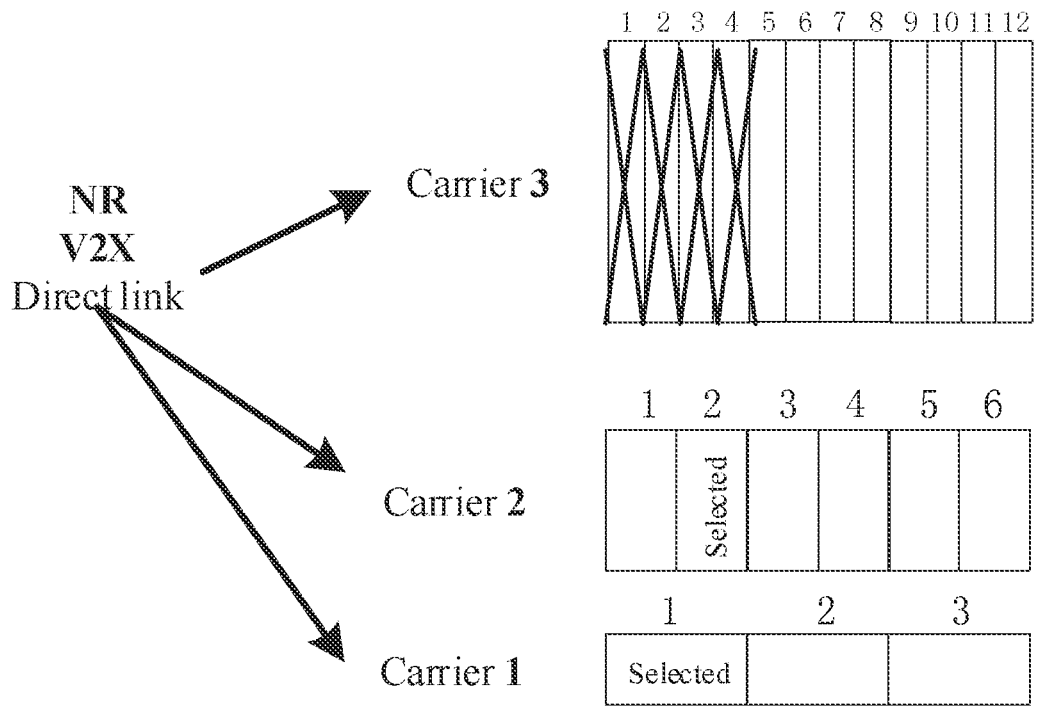
FIG. 7B is a schematic diagram in which the carrier avoids the PA phase discontinuity (excluding the first slot resources) caused by the selection of transmitting resources in the first case in an embodiment of the present application.

As shown in FIG. 7B, the carriers 1, 2 and 3 are all sidelink carriers of NR V2X, the sub-carrier spacing of the carrier 1 is 15 KHz, and the corresponding slot length is 1 ms; the sub-carrier spacing of the carrier 2 is 30 KHz, and the corresponding slot length is 0.5 ms; the sub-carrier spacing of the carrier 3 is 60 KHz, and the corresponding slot length is 0.25 ms; the UE selects transmitting resources for service packets on the carrier 3; the slot 1 of the carrier 1 has been selected, and the slot 2 of the carrier 2 has been selected; the number of transmitting links supported by the UE is 3; and the number of PAs of the UE is 2.

All slots on the carrier 3 are judged successively according to the above conditions. Since there are service packets sent simultaneously in the slot 1 on the carrier 1 on the same time domain as the slot 1 on the carrier 3, and the starting point and ending point of the slot 1 on the carrier 3 are the same as those of the slot 1 on the carrier 1, the slot 1 on the carrier 3 is excluded; since there are service packets sent simultaneously in the slot 1 on the carrier 1 on the same time domain as the slot 2 on the carrier 3, and the starting point and ending point of the slot 2 on the carrier 3 are the same as those of the slot 1 on the carrier 1, the slot 2 on the carrier 3 is excluded; since there are service packets sent simultaneously in the slot 1 on the carrier 1 and there are also service packets sent simultaneously in the slot 2 on the carrier 2 on the same time domain as the slot 3 on the carrier 3, and the starting point and ending point of the slot 3 on the carrier 3 are the same as those of the slot 1 on the carrier 1, the slot 3 on the carrier 3 is excluded; since there are service packets sent simultaneously in the slot 1 on the carrier 1 and there are also service packets sent simultaneously in the slot 2 on the carrier 2 on the same time domain as the slot 4 on the carrier 3, and the starting point and ending point of the slot 4 on the carrier 3 are the same as those of the slot 1 on the carrier 1, the slot 4 on the carrier 3 is excluded; but there is no service packet sent on other candidate resource sets on the same time domain as the slots 5-12 on the carrier 3, so the slots 5-12 on the carrier 3 are not excluded. Therefore, the slots 1, 2, 3 and 4 on the carrier 3 have different starting points and ending points from the slot 1 on the carrier 1 and the slot 2 on the carrier 2, and the UE has only 2 PAs; so the slots 1, 2, 3 and 4 on the carrier 3 are the first slot resources, and the candidate resources on the above slots are all excluded.

Figure 8A:
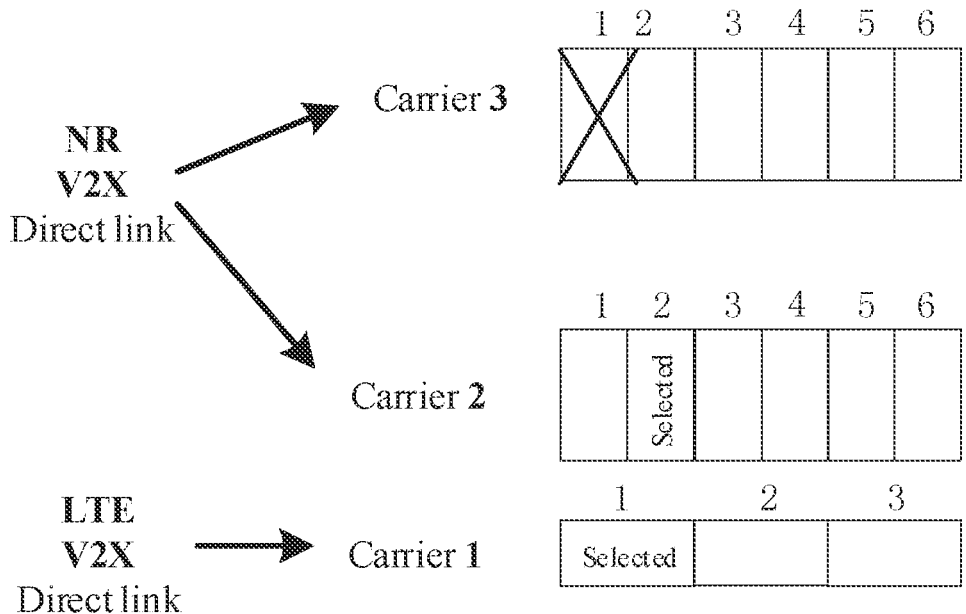
FIG. 8A is a schematic diagrams in which the carrier avoids the PA phase discontinuity (excluding the first slot resources) caused by the selection of transmitting resources in the first case in an embodiment of the present application.

In a second scenario, as shown in FIG. 8A, the carrier 1 is a sidelink carrier of LTE V2X, and the carriers 2 and 3 are sidelink carriers of NR V2X; the sub-carrier spacing of the carrier 1 is 15 KHz, and the corresponding slot length is 1 ms; the sub-carrier spacing of the carrier 2 is 30 KHz, and the corresponding slot length is 0.5 ms; the sub-carrier spacing of the carrier 3 is 30 KHz, and the corresponding slot length is 0.5 ms; the UE selects transmitting resources for service packets on the carrier 3; the slot 1 of the carrier 1 has been selected, and the slot 2 of the carrier 2 has been selected; the number of transmitting links supported by the UE is 3; and the number of PAs of the UE is 2.

All slots on the carrier 3 are judged successively according to the above conditions. Since there are service packets sent simultaneously in the slot 1 on the carrier 1 on the same time domain as the slot 1 on the carrier 3, and the starting point and ending point of the slot 1 on the carrier 3 are the same as those of the slot 1 on the carrier 1, the slot 1 on the carrier 3 is excluded; since there are service packets sent simultaneously in the slot 1 on the carrier 1 and there are also service packets sent simultaneously in the slot 2 on the carrier 2 on the same time domain as the slot 2 on the carrier 3, but the starting point and ending point of the slot 2 on the carrier 3 are the same as those of the slot 2 on the carrier 2, the slot 2 on the carrier 3 is not excluded; there is no service packet sent on other candidate resource sets on the same time domain as the slots 3-6 on the carrier 3, so the slots 3-6 on the carrier 3 are not excluded. Therefore, the slot 1 on the carrier 3 has different starting and ending points from the slot 1 on the carrier 1 and the slot 2 on the carrier 2, the UE has only 2 PAs, the slot 1 on the carrier 1 and the slot 2 on the carrier 2 are selected respectively, and the UE of the slot 1 on the carrier 1 and that of the slot 2 on the carrier 2 are the same; so the slot 1 on the carrier 3 is determined as the first slot resource, and the candidate resources on the slot 1 on the carrier 3 are all excluded.

Figure 8B:
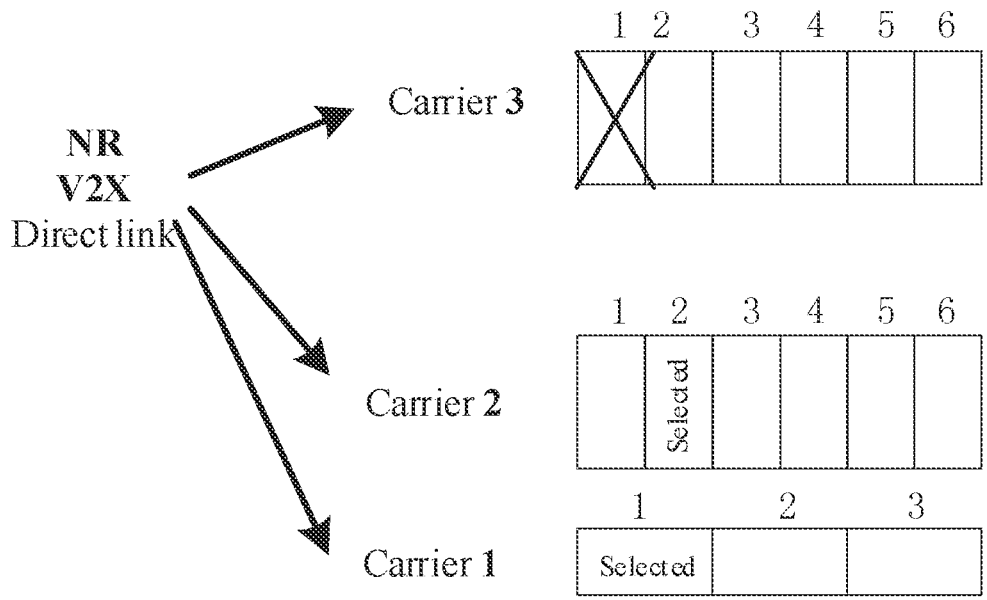
FIG. 8B is a schematic diagram in which the carrier avoids the PA phase discontinuity (excluding the first slot resources) caused by the selection of transmitting resources in the first case in an embodiment of the present application.

As shown in FIG. 8B, the carriers 1, 2 and 3 are sidelink carriers of NR V2X; the sub-carrier spacing of the carrier 1 is 15 KHz, and the corresponding slot length is 1 ms; the sub-carrier spacing of the carrier 2 is 30 KHz, and the corresponding slot length is 0.5 ms; the sub-carrier spacing of the carrier 3 is 30 KHz, and the corresponding slot length is 0.5 ms; the UE selects transmitting resources for service packets on the carrier 3; the slot 1 of the carrier 1 has been selected, and the slot 2 of the carrier 2 has been selected; the number of transmitting links supported by the UE is 3; and the number of PAs of the UE is 2.

All slots on the carrier 3 are judged successively according to the above conditions. Since there are service packets sent simultaneously in the slot 1 on the carrier 1 on the same time domain as the slot 1 on the carrier 3, and the starting point and ending point of the slot 1 on the carrier 3 are the same as those of the slot 1 on the carrier 1, the slot 1 on the carrier 3 is excluded; since there are service packets sent simultaneously in the slot 1 on the carrier 1 and there are also service packets sent simultaneously in the slot 2 on the carrier 2 on the same time domain as the slot 2 on the carrier 3, but the starting point and ending point of the slot 2 on the carrier 3 are the same as those of the slot 2 on the carrier 2, the slot 2 on the carrier 3 is not excluded; there is no service packet sent on other candidate resource sets on the same time domain as the slots 3-6 on the carrier 3, so the slots 3-6 on the carrier 3 are not excluded. Therefore, the slot 1 on the carrier 3 has different starting and ending points from the slot 1 on the carrier 1 and the slot 2 on the carrier 2, the UE has only 2 PAs, the slot 1 on the carrier 1 and the slot 2 on the carrier 2 are selected respectively, and the UE of the slot 1 on the carrier 1 and that of the slot 2 on the carrier 2 are the same; so the slot 1 on the carrier 3 is determined as the first slot resource, and the candidate resources on the slot 1 on the carrier 3 are all excluded.

Here, as can be seen from the above, the slot resources that cause the PA phase discontinuity when sharing the PAs have been excluded, so it can be ensured that the slot resources that cause the PA phase discontinuity are not selected for the service packets that share the Pas, when the PA sharing is performed on the service packets exceeding the number of PAs, so as to avoid the problem of significantly reduced system performance due to the phase discontinuity when the PAs are shared in the process of transmitting service packets.

Fifth Embodiment

Since the process of transmitting service packets may be affected by half-duplex, in order to avoid the UE from being unable to receive due to occupying more slots, the service packets should be sent in the more concentrated time domain as much as possible. Thus, the transmitting resources can be selected preferentially from the available candidate set excluding the first slot resources. Therefore, on the basis of the foregoing embodiments, the step of selecting the transmitting resources from the available candidate set excluding the first slot resources includes:

determining second slot resources in the available candidate set, and selecting the transmitting resources preferentially in available candidate resources on the second slot resources; where the second slot resources are slot resources that transmit service packets simultaneously on other candidate resources selected for other service packets.

Here, the determining the second slot resources in the available candidate set includes:

traversing all slots in a remaining available candidate resource set after excluding the first slot resources, where a second target slot that meets the following condition is the second slot resource:

the UE simultaneously transmits service packets on other candidate resource sets on same time domains with a second target slot.

Figure 9A:
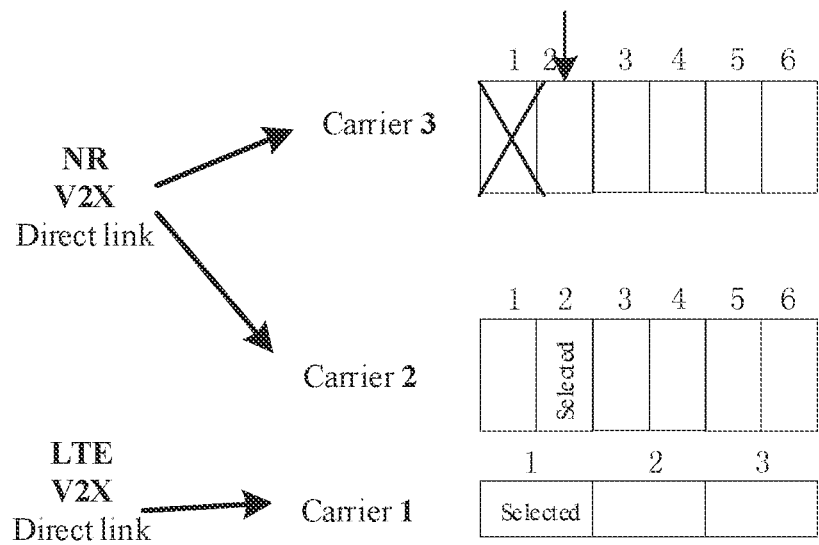
FIG. 9A is a schematic diagrams of centralized transmitting slots (determining the second slot resources) in an embodiment of the present application.

As shown in FIG. 9A, the carrier 1 is a sidelink carrier of LTE V2X, and the carriers 2 and 3 are sidelink carriers of NR V2X; the sub-carrier spacing of the carrier 1 is 15 KHz, and the corresponding slot length is 1 ms; the sub-carrier spacing of the carrier 2 is 30 KHz, and the corresponding slot length is 0.5 ms; the sub-carrier spacing of the carrier 3 is 60 KHz, and the corresponding slot length is 0.25 ms; the UE selects transmitting resources for service packets on the carrier 3; the slot 1 of the carrier 1 has been selected, and the slot 2 of the carrier 2 has been selected; the number of transmitting links supported by the UE is 3; and the number of PAs of the UE is 2, where the candidate resources on the slot 1 on the carrier 3 have been excluded because they will cause the PA phase discontinuity.

Then, for the carrier 3, the available resources after excluding the first slot resources are slots 2-6, where only the slot 2 on the carrier 3 has service packets sent simultaneously on the carrier 1 and carrier 2, so the slot 2 on the carrier 3 is determined as the second slot resource, and the transmitting resources are preferentially selected on the slot 2 on the carrier 3.

Figure 9B:
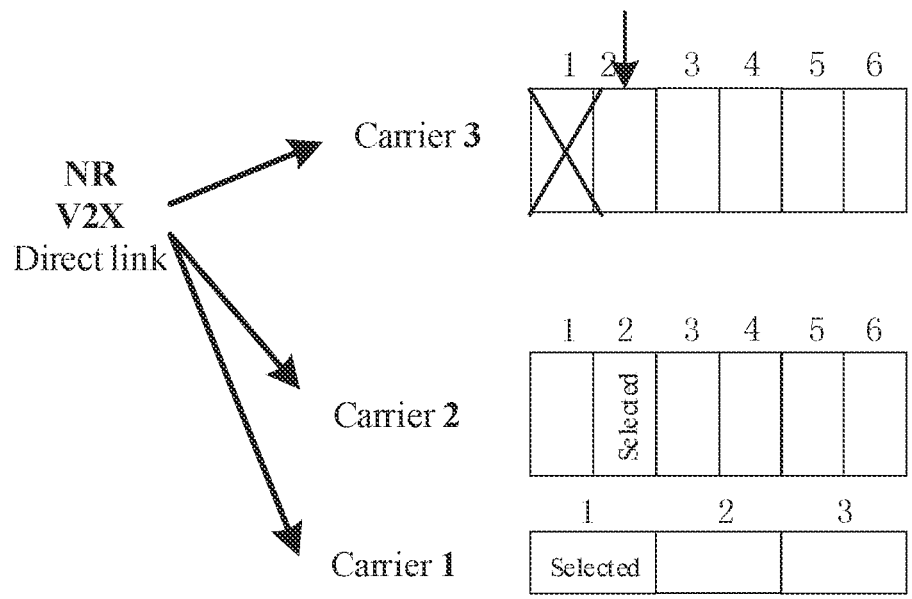
FIG. 9B is a schematic diagram of centralized transmitting slots (determining the second slot resources) in an embodiment of the present application.

As shown in FIG. 9B, the carriers 1, 2 and 3 are sidelink carriers of NR V2X; the sub-carrier spacing of the carrier 1 is 15 KHz, and the corresponding slot length is 1 ms; the sub-carrier spacing of the carrier 2 is 30 KHz, and the corresponding slot length is 0.5 ms; the sub-carrier spacing of the carrier 3 is 60 KHz, and the corresponding slot length is 0.25 ms; the UE selects transmitting resources for service packets on the carrier 3; the slot 1 of the carrier 1 has been selected, and the slot 2 of the carrier 2 has been selected; the number of transmitting links supported by the UE is 3; and the number of PAs of the UE is 2; where the candidate resources on the slot 1 on the carrier 3 have been excluded because they will cause the PA phase discontinuity.

Then, for the carrier 3, the available resources after excluding the first slot resources are slots 2-6, where only the slot 2 on the carrier 3 has service packets sent simultaneously on the carrier 1 and carrier 2, so the slot 2 on the carrier 3 is determined as the second slot resource, and the transmitting resources are preferentially selected on the slot 2 on the carrier 3.

Here, the determined second slot resource is determined from the remaining available candidate resource set after excluding the first slot resources, and there are service packets sent simultaneously on other candidate resource sets on the time domain of the second slot resources, so it means that the determined second slot resource must have the same starting point and ending point as the slot of the service packet that is sent simultaneously on any other candidate resource set. Therefore, when a service packet is sent on the second slot resource, it must also share the PAs with the service packet that is sent simultaneously on any other candidate resource set, so that it can be ensured that the transmitting resources selected for the service packets sharing the PAs are all the slot resources of the PA phase, so as to avoid the problem of significantly reduced system performance due to the phase discontinuity when the PAs are shared in the process of transmitting service packets.

Sixth Embodiment

After determining the corresponding number of slots and determining the slots that can share PAs according to the number of PAs, the number of times the service packets are sent also be considered. Therefore, on the basis of the foregoing embodiments, in an embodiment of the present application, the method further includes:

if the number of preferentially selected transmitting resources is less than the number of times the current service packet is sent, selecting a preset quantity of transmitting resources in the remaining available candidate resource set after excluding the first slot resources in addition to the preferentially selected transmitting resources.

Specifically, the selecting the preset quantity of transmitting resources in the remaining available candidate resource set after excluding the first slot resources in addition to the preferentially selected transmitting resources, includes:

determining third slot resources, and selecting a preset quantity of transmitting resources preferentially in available candidate resources on the third slot resources; where the third slot resources are slot resources having a same parameter set as any one of other candidate resource sets currently sent by the UE, in slot resources where the available candidate resources are located after excluding the first and second slot resources.

Figure 10A:
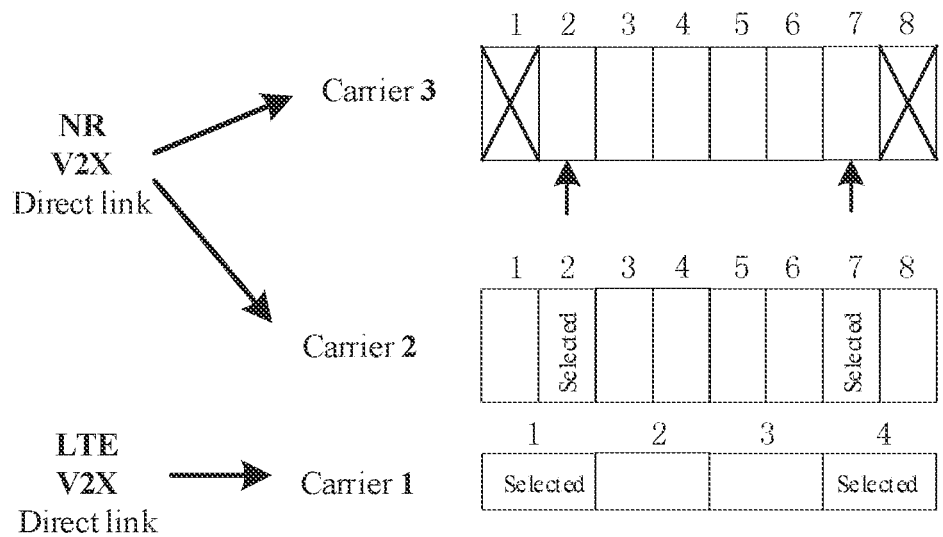
FIG. 10A is a schematic diagrams of selecting resources when the number of transmitting resources that can be preferentially selected is less than the number of times the current service packet is sent in an embodiment of the present application.

As shown in FIG. 10A, the carrier 1 is a sidelink carrier of LTE V2X, and the carriers 2 and 3 are sidelink carriers of NR V2X; the sub-carrier spacing of the carrier 1 is 15 KHz, and the corresponding slot length is 1 ms; the sub-carrier spacing of the carrier 2 is 30 KHz, and the corresponding slot length is 0.5 ms the sub-carrier spacing of the carrier 3 is 30 KHz, and the corresponding slot length is 0.5 ms the UE selects transmitting resources for service packets on the carrier 3: the slots 1 and 4 of the carrier 1 have been selected and the slots 2 and 7 of the carrier 2 have been selected; the number of transmitting links supported by the UE is 3; the number of PAs of the UE is 2: the candidate resources on the slots 1 and 8 on the carrier 3 have been excluded because they will cause the PA phase discontinuity; the available candidate resources on the slots 2 and 7 on the carrier 3 are preferentially selected resources; and the number of times the service packet is sent is 3.

Since the available candidate resources on the slots 2 and 7 on the carrier 3 are preferentially selected resources, and the number of service packets to be sent at this time is 3, it is necessary to reselect a slot in the remaining available candidate resource set after excluding the first slot resources in addition to the preferentially selected transmitting resources.

Since the carrier 3 and carrier 2 have the same parameter set, one candidate resource can be selected in the remaining available candidate resources after excluding the first slot resources in addition to the preferentially selected transmitting resources preferentially on the carrier 3, where the remaining available candidate resource set after excluding the first slot resources in addition to the preferentially selected transmitting resources on the carrier 3 is slots 3-6. Thus, the UE can select any one of the slots 3-6 on the carrier 3.

Figure 10B:
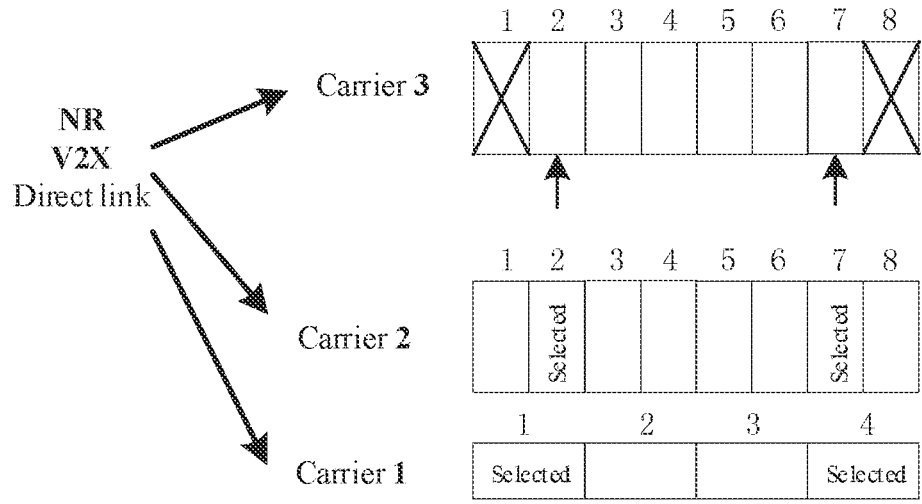
FIG. 10B is a schematic diagram of selecting resources when the number of transmitting resources that can be preferentially selected is less than the number of times the current service packet is sent in an embodiment of the present application.

As shown in FIG. 10B, the carriers 1, 2 and 3 are sidelink carriers of NR V2X; the sub-carrier spacing of the carrier 1 is 15 KHz, and the corresponding slot length is 1 ms; the sub-carrier spacing of the carrier 2 is 30 KHz, and the corresponding slot length is 0.5 ms; the sub-carrier spacing of the carrier 3 is 30 KHz, and the corresponding slot length is 0.5 ms; the UE selects transmitting resources for service packets on the carrier 3; the slots 1 and 4 of the carrier 1 have been selected, and the slots 2 and 7 of the carrier 2 have been selected; the number of transmitting links supported by the UE is 3; the number of PAs of the UE is 2; the candidate resources on the slots 1 and 8 on the carrier 3 have been excluded because they will cause the PA phase discontinuity; the available candidate resources on the slots 2 and 7 on the carrier 3 are preferentially selected resources; and the number of times the service packet is sent is 3.

Since the available candidate resources on the slots 2 and 7 on the carrier 3 are preferentially selected resources, and the number of service packets to be sent at this time is 3, it is necessary to reselect a slot in the remaining available candidate resource set after excluding the first slot resources in addition to the preferentially selected transmitting resources.

Since the carrier 3 and carrier 2 have the same parameter set, one candidate resource can be selected in the remaining available candidate resources after excluding the first slot resources in addition to the preferentially selected transmitting resources preferentially on the carrier 3, where the remaining available candidate resource set after excluding the first slot resources in addition to the preferentially selected transmitting resources on the carrier 3 is slots 3-6. Thus, the UE can select any one of the slots 3-6 on the carder 3.

In the embodiments of the present application, the slot resources with the same parameter set in any one of other candidate resource sets currently used by the UE for transmitting are used as the third slot resources, so it can be ensured that the service packets are sent on the slot resources with a relatively concentrated parameter set, so that the resources are excluded in consideration of UE capabilities for the case of different slot lengths when the multi-carrier transmission is performed, to avoid the power fluctuation caused by the PA phase discontinuity during PA sharing, and improve the system performance.

Seventh Embodiment

Figure 11:
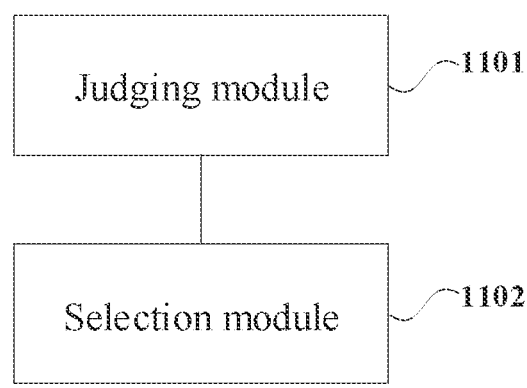
FIG. 11 is a first one of structural block diagrams of a resource selection apparatus provided in an embodiment of the present application.

According to another aspect of the present application, a resource selection apparatus is further provided, and as shown in FIG. 11, the apparatus includes:

a judging module 1101 configured to: when a plurality of service packets arrive, for each service packet, determine the each service packet as a current service packet in sequence, and judge whether the number of candidate resource sets obtained for the current service packet is at least two; and a selection module 1102 configured to: if the number of candidate resource sets obtained for the current service packet is at least two, determine, according to parameter sets corresponding to the candidate resource sets, a candidate resource set corresponding to a parameter set with a smallest slot length among the parameter sets as a target resource set of the current service packet.

Specifically, the selection module 1102 is specifically configured to: if multiple parameter sets with the smallest slot length are in the parameter sets, select a target resource set from candidate resource sets corresponding to the parameter sets with the smallest slot length according to at least one of:

selecting a candidate resource set randomly;

selecting a candidate resource set with a lowest frequency;

selecting a candidate resource set of which the priority corresponds to the priority of the current service packet;

selecting a candidate resource set with a largest frequency-domain resource;

selecting a candidate resource set with lowest load; or selecting a candidate resource set with most remaining resources after occupied resources are excluded.

Eighth Embodiment

Figure 12:
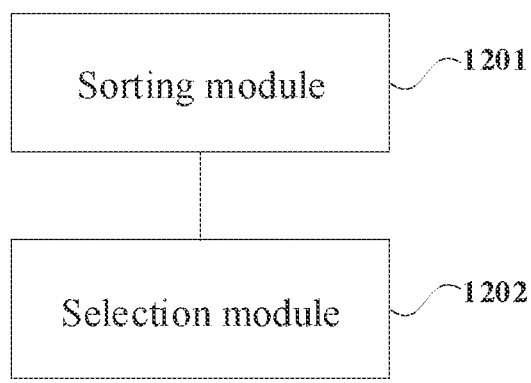
FIG. 12 is a second one of structural block diagrams of a resource selection apparatus provided in an embodiment of the present application.

According to another aspect of the present application, a resource selection apparatus is further provided, and as shown in FIG. 12, the apparatus includes a sorting module 1201 and a selection module 1202:

the sorting module 1201 is configured to: when a plurality of service packets arrive, perform exclusion of occupied resources and/or power sorting in a corresponding target candidate resource set successively for each service packet; and the selection module 1202 is configured to: exclude, according to the number of PAs of the UE, first slot resources from an available candidate resource set for which exclusion of occupied resources and/or power sorting is performed, and then select transmitting resources.

Specifically, the selection module 1202 is specifically configured to: traverse all slots in the available candidate resource set, and exclude a first target slot that simultaneously meets following conditions as a first slot resource;

where the conditions include:

the UE simultaneously transmits service packets on other candidate resource sets on same time domains with a first target slot;

the UE simultaneously transmits service packets on other candidate resource sets on the slots that have different starting and ending points from the first target slot; and the number of slots having different starting and ending points among slots that are used to transmit service packets simultaneously on other candidate resource sets has been equal to the number of the PAs that the UE has.

Specifically, the selection module 1202 is specifically configured to: determine second slot resources in the available candidate set excluding the first slot resources, and select the transmitting resources preferentially in available candidate resources on the second slot resources; where the second slot resources are slot resources that transmit service packets simultaneously on other candidate resources selected for other service packets.

Specifically, the selection module 1202 is specifically configured to: traverse all slots in a remaining available candidate resource set after excluding the first slot resources, and exclude a second target slot that meets a following condition as the second slot resource; where the condition is: the UE simultaneously transmits service packets on other candidate resource sets on same time domains with a second target slot.

Specifically, the selection module 1202 is specifically configured to: if the number of preferentially selected transmitting resources is less than the number of times the current service packet is sent, select a preset quantity of transmitting resources in the remaining available candidate resource set after excluding the first slot resources in addition to the preferentially selected transmitting resources.

Specifically, the selection module 1202 is specifically configured to: determine third slot resources, and select a preset quantity of transmitting resources preferentially in available candidate resources on the third slot resources; where the third slot resources are slot resources having a same parameter set as any one of other candidate resource sets currently sent by the UE, in slot resources where the available candidate resources are located after excluding the first and second slot resources.

Specifically, the selection module 1202 is specifically configured to: when a plurality of service packets arrive, select the transmitting resources in the corresponding target candidate resource set successively for each service packet according to at least one of:

an order of slot lengths in parameter sets of all target candidate resource sets from small to large;

an order of the number of same slot lengths in parameter sets of all target candidate resource sets from more to less;

the numbering order of target candidate resource sets configured at the network side or pre-configured;

the priority order of target candidate resource sets configured at the network side or pre-configured;

the priority order of service packets corresponding to target candidate resource sets; and the resource selection order of target candidate resource sets notified by high-level.

Ninth Embodiment

Figure 13:
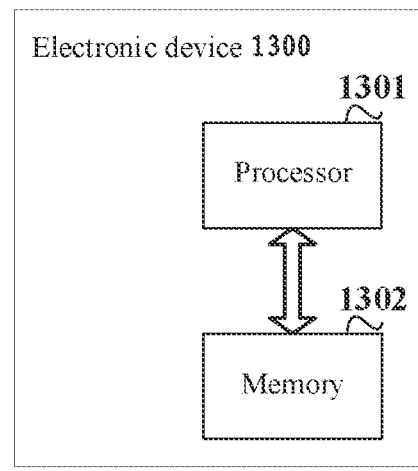
FIG. 13 is an electronic device provided in an embodiment of the present application.

According to another aspect of the present application, a UE is further provided. As shown in FIG. 13, the UE 1300 includes a processor 1301 and a memory 1302.

The processor 1301 is configured to read a program in the memory 1302 to perform:

when a plurality of service packets arrive, fir each service packet, if the number of candidate resource sets obtained for the each service packet is at least two, then determining, according to parameter sets corresponding to the candidate resource sets, a candidate resource set corresponding to a parameter set with a smallest slot length among the parameter sets as a target resource set of the each service packet.

The processor 1301 is further configured to: if multiple parameter sets with the smallest slot length are in the parameter sets, select a target resource set from candidate resource sets corresponding to the parameter sets with the smallest slot length according to at least one of:

selecting a candidate resource set randomly;

selecting a candidate resource set with a lowest frequency;

selecting a candidate resource set of which the priority corresponds to the priority of the each service packet;

selecting a candidate resource set with a largest frequency-domain resource;

selecting a candidate resource set with lowest load; or selecting a candidate resource set with most remaining resources after occupied resources are excluded.

In FIG. 13, the bus architecture can include any numbers of interconnected buses and bridges, and specifically link various circuits of one or more processors represented by the processor 1301 and the memory represented by the memory 1302. The bus architecture may further link various other circuits such as peripheral device, voltage regulator and power management circuit, which are all well known in the art and thus will not be further described again herein.

Optionally, the processor 1301 may be Central Processing Unit (CPU), Application Specific Integrated Circuit (ASIC), Field-Programmable Gate Array (FPGA) or Complex Programmable Logic Device (CPLD).

Tenth Embodiment

Figure 14:
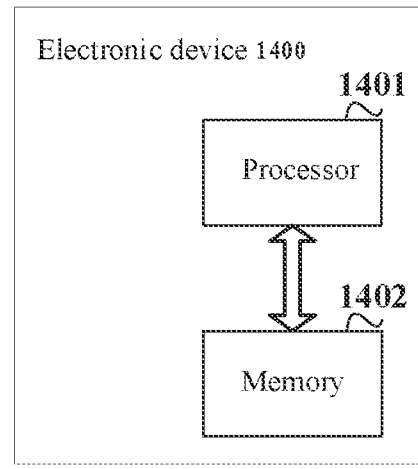
FIG. 14 is an electronic device provided in an embodiment of the present application.

According to another aspect of the present application, a UE is further provided. As shown in FIG. 14, the UE 1400 includes a processor 1401 and a memory 1402.

The processor 1401 is configured to read a program in the memory 1402 to perform:

when a plurality of service packets arrive, selecting, by a UE, transmitting resources in a corresponding target candidate resource set successively for each service packet; for each service packet: excluding, by the UE, according to the number of PAs of the UE, first slot resources from an available candidate resource set after performing exclusion of occupied resources and/or power sorting on a target candidate resource set corresponding to the each service packet, and selecting transmitting resources in an available candidate set excluding the first slot resources; wherein the first slot resources are slot resources that cause PA phases to be discontinuous when the PAs are shared.

The processor 1401 is specifically configured to: traverse all slots in the available candidate resource set, and exclude a first target slot that simultaneously meets following conditions as a first slot resource;

where the conditions include:

the UE simultaneously transmits service packets on other candidate resource sets on same time domains with a first target slot;

the UE simultaneously transmits service packets on other candidate resource sets on the slots that have different starting and ending points from the first target slot; and the number of slots having different starting and ending points among slots that are used to transmit service packets simultaneously on other candidate resource sets has been equal to the number of the PAs that the UE has.

The processor 1401 is specifically configured to: determine second slot resources in the available candidate set excluding the first slot resources, and select the transmitting resources preferentially in available candidate resources on the second slot resources; where the second slot resources are slot resources that transmit service packets simultaneously on other candidate resources selected for other service packets.

The processor 1401 is specifically configured to: traverse all slots in a remaining available candidate resource set after excluding the first slot resources, and exclude a second target slot that meets a following condition as a second slot resource; where the condition is: the UE simultaneously transmits service packets on other candidate resource sets on same time domains with a second target slot.

The processor 1401 is specifically configured to: if the number of preferentially selected transmitting resources is less than the number of times the current service packet is sent, select a preset quantity of transmitting resources in the remaining available candidate resource set after excluding the first slot resources in addition to the preferentially selected transmitting resources.

The processor 1401 is specifically configured to: determine third slot resources, and select a preset quantity of transmitting resources preferentially in available candidate resources on the third slot resources; where the third slot resources are slot resources having a same parameter set as any one of other candidate resource sets currently sent by the UE in slot resources where the available candidate resources are located after excluding the first and second slot resources.

The processor 1401 is specifically configured to: when a plurality of service packets arrive, select the transmitting resources in the corresponding target candidate resource set successively for each service packet according to at least one of:

an order of slot lengths in parameter sets of all target candidate resource sets from small to large;

an order of the number of same slot lengths in parameter sets of all target candidate resource sets from more to less:

the numbering order of target candidate resource sets configured at the network side or pre-configured;

the priority order of target candidate resource sets configured at the network side or pre-configured;

the priority order of service packets corresponding to target candidate resource sets; and the resource selection order of target candidate resource sets notified by high-level.

In FIG. 14, the bus architecture can include any numbers of interconnected buses and bridges, and specifically link various circuits of one or more processors represented by the processor 1401 and the memory represented by the memory 1402. The bus architecture may further link various other circuits such as peripheral device, voltage regulator and power management circuit, which are all well known in the art and thus will not be further described again herein.

Optionally, the processor 1401 may be Central Processing Unit (CPU), Application Specific Integrated Circuit (ASIC), Field-Programmable Gate Array (FPGA) or Complex Programmable Logic Device (CPLD).

Eleventh Embodiment

According to another aspect of the present application, there is also provided a computer readable storage medium, which stores a computer program executable by an electronic device. When the program runs on the electronic device, the electronic device performs the steps in the following method:

when a plurality of service packets arrive, for each service packet, if the number of candidate resource sets obtained for the each service packet is at least two, then determining, according to parameter sets corresponding to the candidate resource sets, a candidate resource set corresponding to a parameter set with a smallest slot length among the parameter sets as a target resource set of the each service packet.

Specifically, if multiple parameter sets with the smallest slot length are in the parameter sets, a target resource set is selected from candidate resource sets corresponding to the parameter sets with the smallest slot length according to at least one of:

selecting a candidate resource set randomly;

selecting a candidate resource set with a lowest frequency;

selecting a candidate resource set of which the priority corresponds to the priority of the each service packet;

selecting a candidate resource set with a largest frequency-domain resource;

selecting a candidate resource set with lowest load; or selecting a candidate resource set with most remaining resources after occupied resources are excluded.

The above-mentioned computer readable storage medium may be any available media or data storage device accessible to a processor in an electronic device, including but not limited to magnetic memory (e.g., floppy disk, hard disk, magnetic tape, Magnetic Optical disc (MO) or the like), optical memory (e.g., CD, DVD, BD, HVD or the like), semiconductor memory ROM, EPROM, EEPROM, non-volatile memory (NAND FLASH), Solid State Disk (SSD)) or the like.

Twelfth Embodiment

According to another aspect of the present application, there is also provided a computer readable storage medium, which stores a computer program executable by an electronic device. When the program runs on the electronic device, the electronic device performs the steps in the following method:

when a plurality of service packets arrive, selecting, by a UE, transmitting resources in a corresponding target candidate resource set successively for each service packet; for each service packet: excluding, by the UE, according to the number of PAs of the UE, first slot resources from an available candidate resource set after performing exclusion of occupied resources and/or power sorting on a target candidate resource set corresponding to the each service packet, and selecting transmitting resources in an available candidate set excluding the first slot resources; where the first slot resources are slot resources that cause PA phases to be discontinuous when the PAs are shared.

Specifically, the excluding the first slot resources includes:

traversing all slots in the available candidate resource set, and excluding a first target slot that simultaneously meets following conditions as a first slot resource;

where the conditions include:

the UE simultaneously transmits service packets on other candidate resource sets on same time domains with a first target slot;

the UE simultaneously transmits service packets on other candidate resource sets on the slots that have different starting and ending points from the first target slot; and the number of slots having different starting and ending points among slots that are used to transmit service packets simultaneously on other candidate resource sets has been equal to the number of the PAs that the UE has.

Specifically, the selecting the transmitting resources in the available candidate set excluding the first slot resources, includes:

determining second slot resources in the available candidate set excluding the first slot resources, and selecting the transmitting resources preferentially in available candidate resources on the second slot resources; where the second slot resources are slot resources that transmit service packets simultaneously on other candidate resources selected for other service packets.

Specifically, the determining the second slot resources in the available candidate set includes:

traversing all slots in a remaining available candidate resource set after excluding the first slot resources, and excluding a second target slot that meets a following condition as a second slot resource;

where the condition is: the UE simultaneously transmits service packets on other candidate resource sets on same time domains with a second target slot.

Specifically, the method further includes:

if the number of preferentially selected transmitting resources is less than the number of times the current service packet is sent, selecting a preset quantity of transmitting resources in the remaining available candidate resource set after excluding the first slot resources in addition to the preferentially selected transmitting resources.

Specifically, the selecting the preset quantity of transmitting resources in the remaining available candidate resource set after excluding the first slot resources in addition to the preferentially selected transmitting resources, includes:

determining third slot resources, and selecting a preset quantity of transmitting resources preferentially in available candidate resources on the third slot resources; where the third slot resources are slot resources having a same parameter set as any one of other candidate resource sets currently sent by the UE in slot resources where the available candidate resources are located after excluding the first and second slot resources.

Specifically, each candidate resource set is at least one kind of:

a carrier;

a resource pool; and a bandwidth part.

Specifically, when the plurality of service packets arrive, the UE selects the transmitting resources in the corresponding target candidate resource set successively for each service packet according to at least one of:

an order of slot lengths in parameter sets of all target candidate resource sets from small to large;

an order of the number of same slot lengths in parameter sets of all target candidate resource sets from more to less;

the numbering order of target candidate resource sets configured at the network side or pre-configured;

the priority order of target candidate resource sets configured at the network side or pre-configured;

the priority order of service packets corresponding to target candidate resource sets; and the resource selection order of target candidate resource sets notified by high-level.

Specifically, each candidate resource set is determined by the UE according to the network configured parameters or according to the pre-configured parameters.

The above-mentioned computer readable storage medium may be any available media or data storage device accessible to a processor in an electronic device, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

For the system/apparatus embodiments, they are substantially similar to the method embodiments, so the description thereof is relatively simple, and the related parts may refer to the partial illustration of the method embodiments.

It should be understood by those skilled in the art that the embodiments of the present application can provide methods, systems and computer program products. Thus the present application can take the form of hardware embodiments alone, software embodiments alone, or embodiments combining the software and hardware aspects. Also the present application can take the form of computer program products implemented on one or more computer usable storage mediums (including but not limited to magnetic disk memories, CD-ROMs, optical memories and the like) containing computer usable program codes therein.

The present application is described by reference to the flow charts and/or the block diagrams of the methods, the devices (systems) and the computer program products according to the embodiments of the present application. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the present application have been described, those skilled in the art can make additional alterations and modifications to these embodiments once they learn about the basic creative concepts. Thus the attached claims are intended to be interpreted to include the preferred embodiments as well as all the alterations and modifications falling within the scope of the present application.

Evidently those skilled in the art can make various modifications and variations to the present application without departing from the spirit and scope of the present application. Thus the present application is also intended to encompass these modifications and variations therein as long as these modifications and variations to the present application come into the scope of the claims of the present application and their equivalents.

What is claimed is:

1. A resource selection method, comprising:
    when a plurality of service packets arrive, selecting, by a user equipment (UE), transmitting resources in a corresponding target candidate resource set successively for each service packet of the service packets:
    for the each service packet:
    excluding, by the UE, according to a quantity of power amplifiers, PAs, of the UE, first slot resources from an available candidate resource set after performing exclusion of occupied resources and/or power sorting on a target candidate resource set corresponding to the each service packet, and
    selecting, by the UE, transmitting resources in an available candidate set that excludes the first slot resources; wherein the first slot resources are slot resources that cause PA phase discontinuity when the PAs are shared.

2. The method of claim 1, wherein, the excluding the first slot resources comprises:
    traversing all slots in the available candidate resource set, and excluding a first target slot that simultaneously meets following conditions as a first slot resource;
    wherein the conditions comprise:
    the UE simultaneously transmits service packets on other candidate resource sets on same time domains with a first target slot;
    the UE simultaneously transmits service packets on other candidate resource sets on the slots that have different starting and ending points from the first target slot; and
    a quantity of slots having different starting and ending points among slots that are used to transmit service packets simultaneously on other candidate resource sets has been equal to a quantity of the PAs that the UE has.

3. The method of claim 1, wherein, the selecting the transmitting resources in the available candidate set that excludes the first slot resources, comprises:
    determining second slot resources in the available candidate set that excludes the first slot resources, and selecting the transmitting resources preferentially in available candidate resources on the second slot resources;
    wherein the second slot resources are slot resources that transmit service packets simultaneously on other candidate resources selected for other service packets.

4. The method of claim 3, wherein, the determining the second slot resources in the available candidate set comprises:
    traversing all slots in a remaining available candidate resource set after excluding the first slot resources, and excluding a second target slot that meets a following condition as a second slot resource;
    wherein the condition is: the UE simultaneously transmits service packets on other candidate resource sets on same time domains with a second target slot.

5. The method of claim 3, further comprising:
    if a quantity of preferentially selected transmitting resources is less than a quantity of times the each service packet is sent, selecting a preset quantity of transmitting resources in the remaining available candidate resource set after excluding the first slot resources in addition to the preferentially selected transmitting resources.

6. The method of claim 5, wherein, the selecting the preset quantity of transmitting resources in the remaining available candidate resource set after excluding the first slot resources in addition to the preferentially selected transmitting resources comprises:
    determining third slot resources, and selecting a preset quantity of transmitting resources preferentially in available candidate resources on the third slot resources;
    wherein the third slot resources are slot resources having a same parameter set as any one of other candidate resource sets currently sent by the UE, in slot resources where the available candidate resources are located after excluding the first and second slot resources.

7. The method of claim 1, wherein, each candidate resource set is at least one kind of a carrier, a resource pool and a bandwidth part (BWP).

8. The method of claim 1, wherein, when the plurality of service packets arrive, the UE selects the transmitting resources in the corresponding target candidate resource set successively for each service packet according to at least one of:
    an order of slot lengths in parameter sets of all target candidate resource sets from small to large;
    an order of a quantity of same slot lengths in parameter sets of all target candidate resource sets from more to less;
    a numbering order of target candidate resource sets configured at a network side or pre-configured;
    a priority order of target candidate resource sets configured at the network side or pre-configured;
    a priority order of service packets corresponding to target candidate resource sets; and
    a resource selection order of target candidate resource sets notified by high-level.

9. The method of claim 1, wherein, each candidate resource set is determined by the UE according to network configured parameters or according to pre-configured parameters.

10. A user equipment (UE), comprising:
    a processor and a memory;
    wherein the processor is configured to read a program in the memory to perform:

when a plurality of service packets arrive, selecting, by the UE, transmitting resources in a corresponding target candidate resource set successively for each service packet of the service packets:

for each service packet:

excluding, by the UE, according to a quantity of power amplifiers, PAs, of the UE, first slot resources from an available candidate resource set after performing exclusion of occupied resources and/or power sorting on a target candidate resource set corresponding to the each service packet, and selecting transmitting resources in an available candidate set that excludes the first slot resources; wherein the first slot resources are slot resources that cause PA phases to be discontinuous when the PAs are shared.

11. The UE of claim 10, wherein, the processor is specifically configured to: traverse all slots in the available candidate resource set, and exclude a first target slot that simultaneously meets following conditions as a first slot resource;

wherein the conditions comprise:

the UE simultaneously transmits service packets on other candidate resource sets on same time domains with a first target slot;

the UE simultaneously transmits service packets on other candidate resource sets on the slots that have different starting and ending points from the first target slot; and a quantity of slots having different starting and ending points among slots that are used to transmit service packets simultaneously on other candidate resource sets has been equal to a quantity of the PAs that the UE has.

12. The UE of claim 10, wherein, the processor is specifically configured to: determine second slot resources in the available candidate set that excludes the first slot resources, and select the transmitting resources preferentially in available candidate resources on the second slot resources;

wherein the second slot resources are slot resources that transmit service packets simultaneously on other candidate resources selected for other service packets.

13. The UE of claim 12, wherein, the processor is specifically configured to: traverse all slots in a remaining available candidate resource set after excluding the first slot resources, and exclude a second target slot that meets a following condition as a second slot resource;

wherein the condition is: the UE simultaneously transmits service packets on other candidate resource sets on same time domains with a second target slot.

14. The UE of claim 12, wherein, the processor is specifically configured to: if a quantity of preferentially selected transmitting resources is less than a quantity of times a current service packet is sent, select a preset quantity of transmitting resources in the remaining available candidate resource set after excluding the first slot resources in addition to the preferentially selected transmitting resources.

15. The UE of claim 14, wherein, the processor is specifically configured to: determine third slot resources, and select a preset quantity of transmitting resources preferentially in available candidate resources on the third slot resources;

wherein the third slot resources are slot resources having a same parameter set as any one of other candidate resource sets currently sent by the UE, in slot resources where the available candidate resources are located after excluding the first and second slot resources.

16. The UE of claim 10, wherein, the processor is specifically configured to: when the plurality of service packets arrive, select the transmitting resources in the corresponding target candidate resource set successively for each service packet according to at least one of:

an order of slot lengths in parameter sets of all target candidate resource sets from small to large;

an order of a quantity of same slot lengths in parameter sets of all target candidate resource sets from more to less;

a numbering order of target candidate resource sets configured at a network side or pre-configured;

a priority order of target candidate resource sets configured at the network side or pre-configured;

a priority order of service packets corresponding to target candidate resource sets; and a resource selection order of target candidate resource sets notified by high-level.

* * * * *